United States Patent
Ueda

(10) Patent No.: US 8,606,026 B2
(45) Date of Patent: Dec. 10, 2013

(54) IMAGE ENCODING DEVICE, IMAGE DECODING DEVICE, IMAGE ENCODING METHOD, AND IMAGE DECODING METHOD BASED ON REDUCED-IMAGE DISPLACEMENT VECTOR

(75) Inventor: Motoharu Ueda, Yokohama (JP)

(73) Assignee: JVC Kenwood Corporation, Yokohama-shi (JP)

( * ) Notice: Subject to any disclaimer, the term of this patent is extended or adjusted under 35 U.S.C. 154(b) by 23 days.

(21) Appl. No.: 13/509,759

(22) PCT Filed: Dec. 2, 2010

(86) PCT No.: PCT/JP2010/007019
§ 371 (c)(1),
(2), (4) Date: May 14, 2012

(87) PCT Pub. No.: WO2011/074197
PCT Pub. Date: Jun. 23, 2011

(65) Prior Publication Data
US 2012/0275717 A1    Nov. 1, 2012

(30) Foreign Application Priority Data
Dec. 15, 2009  (JP) .................................. 2009-284017

(51) Int. Cl.
*G06K 9/36* (2006.01)

(52) U.S. Cl.
USPC ........................................................ 382/236

(58) Field of Classification Search
None
See application file for complete search history.

(56) References Cited

U.S. PATENT DOCUMENTS

2010/0118940 A1* 5/2010 Yin et al. ................. 375/240.12

FOREIGN PATENT DOCUMENTS

| JP | 06-113291 A | 4/1994 |
| JP | 09-182082 A | 7/1997 |
| JP | 2005-159947 A | 6/2005 |
| JP | 2007-043651 A | 2/2007 |

OTHER PUBLICATIONS

Siu-Leong Yu et al. "New Intra Prediction using Intra-Macroblock Motion Compensation," Joint Video Team (JVT) of ISO/IEC MEPG & ITU-T VCEG (ISO/IEC JTC1/SC29/WG11 and ITU-T SG16 Q.6), JVT-C151, 3rd Meeting: Fairfax, Virginia, USA, May 6, 2002, pp. 1-3.
Notification of Reasons for Refusal in Japanese Patent Application No. 2009-284017, dated Apr. 2, 2013.

* cited by examiner

*Primary Examiner* — Barry Drennan
*Assistant Examiner* — Feng Niu
(74) *Attorney, Agent, or Firm* — Venable LLP; Michael A. Sartori; Christopher B. Tokarczyk

(57) ABSTRACT

A displacement vector detection unit searches for a signal with high correlation with an encoding target block using a locally-decoded image in an already encoded block so as to calculate, using a signal with the highest correlation as a displacement prediction signal, a displacement vector. A reduced-image displacement vector detection unit searches for a signal with high correlation with the encoding target block using a signal resulting from performing reduction at least either horizontally or vertically for the locally-decoded image in an already encoded block so as to obtain, using the signal with the highest correlation as the displacement prediction signal, the displacement vector indicating the displacement in a screen between a reduced encoding target block and a reduction displacement prediction signal. Then a signal with high correlation with the encoding target block from the displacement prediction signal and the reduction displacement prediction signal is selected as a prediction signal.

5 Claims, 13 Drawing Sheets

IMAGE ENCODING DEVICE, IMAGE DECODING DEVICE, IMAGE ENCODING METHOD, AND IMAGE DECODING METHOD BASED ON REDUCED-IMAGE DISPLACEMENT VECTOR

TECHNICAL FIELD

The present invention relates to a technique for encoding and decoding image signals and to an image encoding device, an image decoding device, an image encoding method, and an image decoding method in which an in-screen prediction process of generating a prediction signal for a target image signal from an encoded image and then encoding a differential signal between the target image signal and the prediction signal is used.

BACKGROUND ART

In recent years, services for distributing digitalized image and audio content via broadcast waves, such as satellite or ground waves, or networks are in practical use, and highly efficient encoding is thus necessary for efficiently recording and transmitting the information of images and sounds that have tremendous amount of information. As content has become finely-resolved and more diverse, the number of images to be encoded and the amount of data have become more increased. Thus, more highly efficient encoding of image signals based on possible future content services is required.

As highly efficient encoding of images, a method represented by MPEG2 and MPEG4-AVC (Advanced Video Coding) is used, which is for compressing the amount of information by means of a correlation between pixels that are spatially adjacent to each other in the same frame of a moving image signal and a correlation between frames or fields that are temporally adjacent to each other.

In MPEG4-AVC (ISO/IEC 14496-10 Advanced Video Coding), high encoding efficiency is achieved by dividing an image into a plurality of two-dimensional blocks, generating a prediction signal by means of a correlation in the same frame or between frames on a block-by-block basis, and then encoding differential information relative to the prediction signal. A prediction process in MPEG4-AVC in which a correlation in the same frame is used is referred to as intra prediction, and a prediction image of an encoding target block is generated by means of a decoding image of an already encoded portion that is adjacent to the target block, as shown in FIG. 11. In intra prediction, a prediction mode with least errors relative to an encoding target block is selected based on a prediction image generated in a plurality (nine kinds when the prediction is performed in units of 4×4 pixel blocks) of prediction modes on the assumption that adjacent decoding images have a high correlation in a certain direction as shown in FIG. 11 so as to perform encoding along with prediction mode information.

Intra prediction is a prediction process in which only a correlation with an adjacent area is used. Thus, when there is only low correlation at a border with an encoding target block, an advantage of the prediction is reduced.

In an image signal, there exists a signal that has image components of a similar shape, pattern, background, etc., of an object even at a position that is apart from a target block. Patent document No. 1 presents a method for performing a prediction process by means of an image correlation at a position apart from a target block. More specifically, an error between an already-encoded decoding image, at a position obtained by moving a target block by an displacement amount (hereinafter, referred to as a "displacement vector") within a screen as shown in FIG. 12, and the encoding target block is calculated, and a reference image referred to by a displacement vector with the least error is set to be a prediction image so as to encode the prediction image along with the displacement vector.

High encoding efficiency can be achieved for intra prediction when a prediction image with high correlation that outweighs an encoding amount for transmitting a displacement vector can be generated. However, sufficient prediction efficiency cannot be realized when the amount of transmitting a displacement vector amount is large.

In order to reduce an encoding amount required for the displacement vector, patent document No. 2 presents a method for identifying the displacement vector without transmitting the displacement vector. In patent document No. 2, an error between an already encoded decoding image, at a position obtained by moving an already-encoded decoding image adjacent to a target block by the displacement vector while using the already-encoded decoding image as a template, and the already-encoded decoding image adjacent to the target block is calculated, and a displacement vector with the least error is used as a displacement vector of the encoding target block so as to set a reference image referred to by the displacement vector to be a prediction image. In this method, a displacement vector can be calculated, without receiving the displacement vector, by detecting the displacement vector using an already encoded decoding image in decoding, as in the case of encoding. Thus, there is no increase in the encoding amount caused due to additional information.

[Patent document No. 1] JP 2005-159947
[Patent document No. 2] JP 2007-043651

SUMMARY OF THE INVENTION

Problem to be Solved by the Invention

In MPEG4-AVC, high encoding efficiency is achieved in a temporally-continuous image signal by performing a motion compensation prediction process with reference to an already decoded image signal of frames that are different in a time direction. However, in a reference frame for performing the motion compensation prediction process, it is necessary to perform encoding using only intra prediction within the same frame. Thus, when there is low correlation at a border with an encoding target block, there exists a problem that an advantage of the prediction is reduced. Even when a moving image signal is not temporally continuous, the problem emerges as a reduction in encoding efficiency caused by performance limitations of intra prediction due to non-functioning motion compensation prediction.

When transmitting or self-generating a displacement vector from a target block (such as those presented in Patent documents No. 1 and No. 2) so as to use image correlation at a position that is apart from the target block, a self-similarity and a textural similarity of an image signal cannot be fully utilized due to effects such as a shape change and brightness change of an object that exists in a screen since prediction is performed based on a self-similarity in a portion of a non-adjacent region with respect to the image signal and on a different object having the same texture component.

Patent document No. 1 has a problem where efficiency is lowered when a prediction signal having an advantage that outweighs an encoding amount of a displacement vector cannot be calculated. Since a displacement vector is calculated using an adjacent image of an encoding target block as a template, Patent document No. 2 has a problem where a highly accurate displacement vector cannot be obtained, preventing the efficiency from being increased, e.g., when there is low correlation between the adjacent image and the target block or when the correlation, with the adjacent image, of a reference block referred to by a displacement vector generated in Patent document No. 1 is low.

In this background, a purpose of the present invention is to achieve an intra-frame prediction method for making more effective use of image correlation at a position that is apart from a target block in order to drastically improve prediction efficiency in a frame.

Means to Solve the Problem

To accomplish the above purpose, an image encoding device according to the present invention has: a displacement vector detection unit configured to search, given an encoding target block, for a signal with high correlation with an encoding target block using a locally-decoded image in a block in a same already encoded image signal so as to calculate, using a signal with the highest correlation as a displacement prediction signal, a displacement vector, which is a displacement in a screen between the encoding target block and the displacement prediction signal; a reduced-image displacement vector detection unit configured to search, given the encoding target block, for a signal with high correlation with the encoding target block using a signal resulting from performing reduction at least either horizontally or vertically for the locally-decoded image in the block in the same already encoded image signal so as to obtain, using the signal with the highest correlation as the displacement prediction signal, the displacement vector, which is a displacement in the screen between a reduced encoding target block and the reduction displacement prediction signal; and a displacement prediction mode determination/signal generation unit configured to select a signal with high correlation with the encoding target block from the displacement prediction signal and the reduction displacement prediction signal and to output a displacement vector used for a signal selected as a prediction signal and information indicating a selection result, and encodes a differential signal between the prediction signal and the encoding target block, the displacement vector, and the information indicating the selection result.

An image decoding device according to the present invention has: a displacement vector/mode decoding unit configured to decode a displacement vector that is a displacement between a prediction signal, generated from a decoding image of a block in a same already decoded image signal for a decoding target block based on an encoding stream encoded in a block unit, and the decoding target block and information indicating whether or not a prediction signal is generated by reducing the decoding image specified by the displacement vector; and a displacement prediction signal generation unit configured to generate a prediction signal from the decoding image in accordance with the displacement vector and the information indicating whether or not the prediction signal is generated by reducing the decoding image, and calculates the decoding image by adding the prediction signal and a decoded residual signal.

An image encoding method according to the present invention comprises: searching, given an encoding target block, for a signal with high correlation with an encoding target block using a locally-decoded image in a block in a same already encoded image signal so as to calculate, using a signal with the highest correlation as a displacement prediction signal, a displacement vector, which is a displacement in a screen between the encoding target block and the displacement prediction signal; searching, given the encoding target block, for a signal with high correlation with the encoding target block using a signal resulting from performing reduction at least either horizontally or vertically for the locally-decoded image in the block in the same already encoded image signal so as to obtain, using the signal with the highest correlation as the displacement prediction signal, the displacement vector, which is a displacement in the screen between a reduced encoding target block and the reduction displacement prediction signal; selecting a signal with high correlation with the encoding target block from the displacement prediction signal and the reduction displacement prediction signal and outputting a displacement vector used for a signal selected as a prediction signal and information indicating a selection result; and encoding a differential signal between the prediction signal and the encoding target block, the displacement vector, and the information indicating the selection result.

An image decoding method according to the present invention comprises: decoding a displacement vector that is a displacement between a prediction signal, generated from a decoding image of a block in a same already decoded image signal for a decoding target block based on an encoding stream encoded in a block unit, and the decoding target block and information indicating whether or not a prediction signal is generated by reducing the decoding image specified by the displacement vector; generating a prediction signal from the decoding image in accordance with the displacement vector and the information indicating whether or not the prediction signal is generated by reducing the decoding image; and calculating the decoding image by adding the prediction signal and a decoded residual signal.

Advantage of the Present Invention

In an image encoding device and an image decoding device according to the present invention, the accuracy of image signal prediction within a frame according to a conventional method can be improved by generating a reference image, which is used as a template signal for predicting a texture component, reduced with respect to already encoded decoding image and by using the reference image as a prediction image. Regarding filter properties in generating a reduced image, evaluation of the properties of an input image at the time of encoding allows signal properties of the reduced image to be close to those of the input image, and prediction accuracy can thus be further improved. Encoding efficiency can be improved by combining these features.

BEST MODE FOR CARRYING OUT THE INVENTION

A description will now be given of a best mode for carrying out the invention in reference to the figures.

First Embodiment

A description is first given of the conformation of an image encoding device and the conformation of an image decoding device according to the first embodiment of the present invention.

Figure 1:
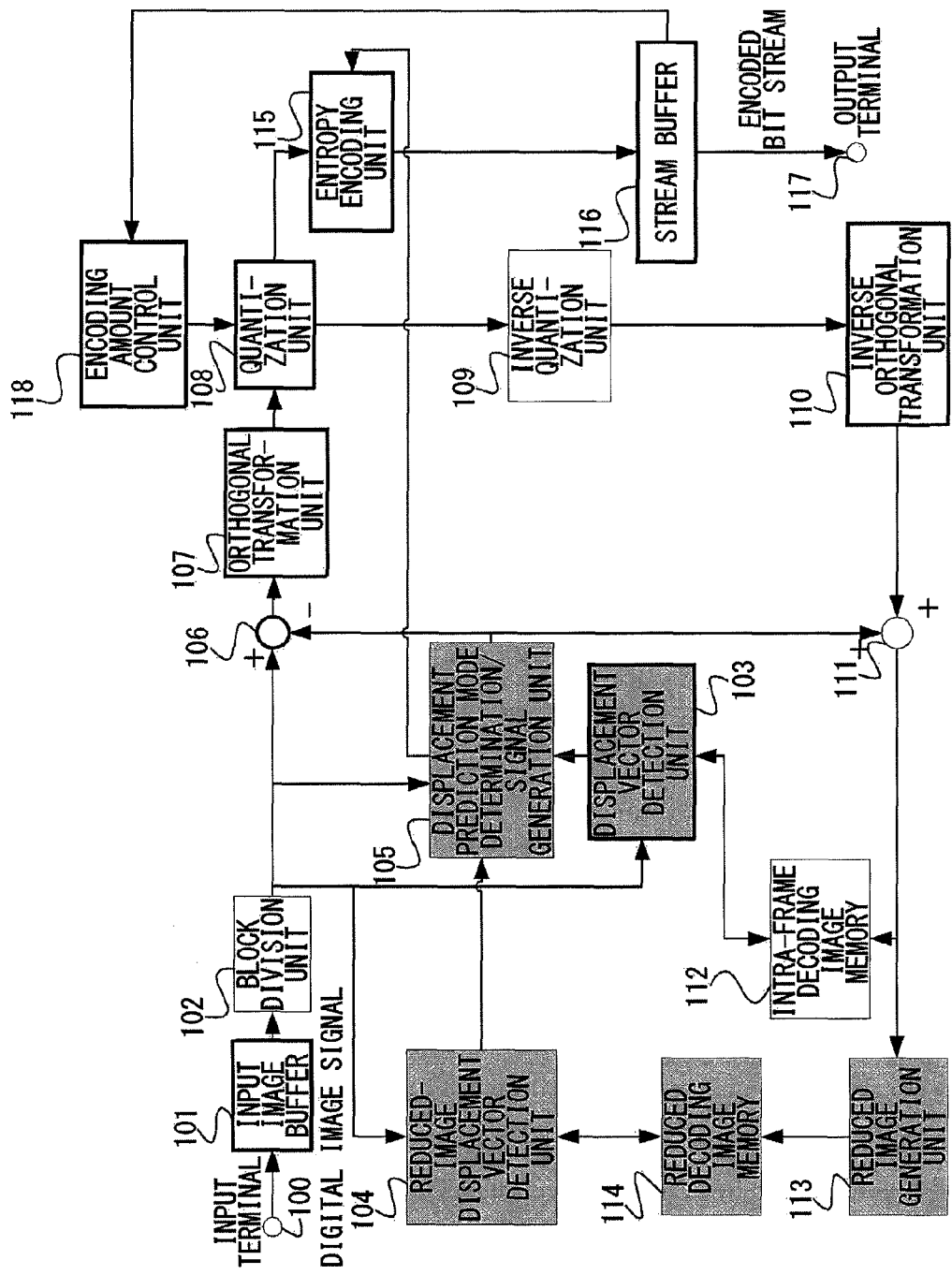
FIG. 1 is a diagram illustrating the configuration of an image encoding device according to a first embodiment of the present invention.

FIG. 1 is a configuration diagram illustrating the conformation of the image encoding device according to the first embodiment of the present invention. As shown in FIG. 1, the image encoding device according to the present embodiment comprises an input terminal 100, an input image buffer 101, a block division unit 102, a displacement vector detection unit 103, a reduced-image displacement vector detection unit 104, a displacement prediction mode determination/signal generation unit 105, a subtractor 106, an orthogonal transformation unit 107, a quantization unit 108, an inverse quantization unit 109, an inverse orthogonal transformation unit 110, an adder 111, an intra-frame decoding image memory 112, a reduced image generation unit 113, a reduced decoding image memory 114, an entropy encoding unit 115, a stream buffer 116, an output terminal 117, and an encoding amount control unit 118.

The displacement vector detection unit 103, the reduced-image displacement vector detection unit 104, the displacement prediction mode determination/signal generation unit 105, the reduced image generation unit 113, and the reduced decoding image memory 114 that are provided and operations in these processing blocks are features of the first embodiment. Other processing blocks serve as processing blocks that configure an intra-frame encoding process in an image encoding device such as MPEG4-AVC, etc.

A digital image signal input by the input terminal 100 is stored in the input image buffer 101. The digital image signal stored in the input image buffer 101 is provided to the block division unit 102 and then cut out as an encoding target block in a unit of a two-dimensional macroblock formed in 16×16 pixels. The block division unit 102 provides a cut-out encoding target block to the displacement vector detection unit 103, the reduced-image displacement vector detection unit 104, the displacement prediction mode determination/signal generation unit 105, and the subtractor 106. The subtractor 106 calculates a difference between the encoding target block provided from the block division unit 102 and a prediction image block provided from the displacement prediction mode determination/signal generation unit 105, which will be described later, and provides a result to the orthogonal transformation unit 107 as a differential block.

The orthogonal transformation unit 107 generates a DCT coefficient that corresponds to an orthogonally-transformed frequency component signal by performing DCT conversion on the differential block in a predetermined two-dimensional block unit (for example, horizontal 8 pixels×vertical 8 pixels). The orthogonal transformation unit 107 organizes the generated DCT coefficient in units of two-dimensional macroblocks and then outputs the generated DCT coefficient to the quantization unit 108. The quantization unit 108 performs a quantization process by dividing the DCT coefficient by a different value for each frequency component. The quantization unit 108 provides the DCT coefficient on which the quantization process has been performed to the inverse quantization unit 109 and the entropy encoding unit 115. The inverse quantization unit 109 performs inverse quantization by multiplying the DCT coefficient, on which the quantization process input by the quantization unit 108 has been performed, by the value by which the division was performed at the time of the quantization process and then outputs an inverse-quantized result to the inverse orthogonal transformation unit 110 as a decoded DCT coefficient. The inverse orthogonal transformation unit 110 performs an inverse DCT process so as to generate a decoded differential block. The inverse orthogonal transformation unit 110 provides the decoded differential block to the adder 111. The adder 111 adds the prediction image block provided from the displacement prediction mode determination/signal generation unit 105 and the decoded differential block provided by the inverse orthogonal transformation unit 110 so as to generate a locally-decoded block. The locally-decoded block generated by the adder 111 is stored in the intra-frame decoding image memory 112 in an inverse block transformed form.

Figure 12:
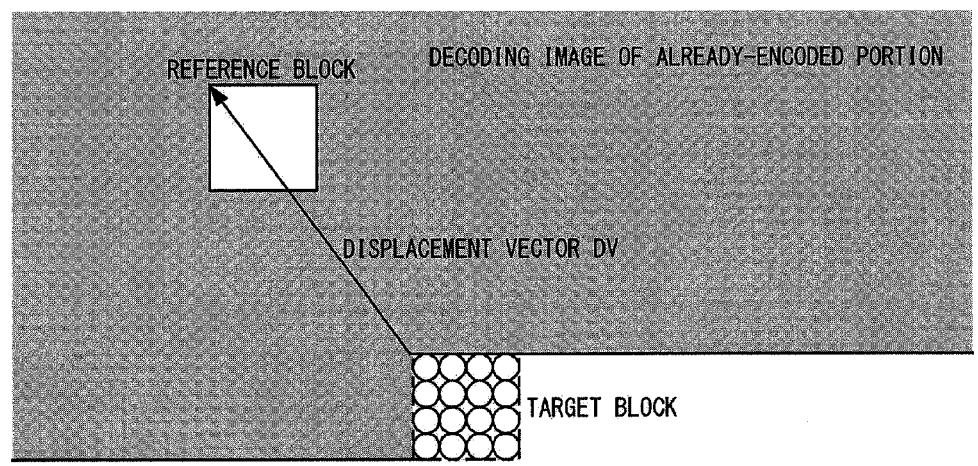
FIG. 12 is a conceptual diagram for intra-screen displacement prediction according to the conventional method.

The displacement vector detection unit 103 calculates a displacement vector between an image signal of the encoding target block input by the block division unit 102 and a locally-decoded image signal stored in the intra-frame decoding image memory 112. More specifically, with respect to the position of the encoding target block in the screen, a correlation value between the locally-decoded image signal, which corresponds to a displacement vector DV that places the entire reference block at a position of the decoding image of the already-encoded portion shown in FIG. 12, and the encoding target block by an evaluation formula defined by the sum of absolute value errors, the sum of square errors, or the like. A displacement vector with the smallest value, which is indicated by the evaluation formula, is set as a displacement vector value that is used for displacement prediction.

The displacement vector detection unit 103 outputs the locally-decoded image signal, which corresponds to the detected displacement vector value, to the displacement prediction mode determination/signal generation unit 105 as a displacement prediction image along with the detected displacement vector value.

The locally-decoded block generated by the adder 111 is input to the reduced image generation unit 113 along with the intra-frame decoding image memory 112. A reduction process is performed on the locally-decoded block, and the reduced locally-decoded block is output to the reduced decoding image memory 114.

With regard to a filter used for the reduction process, a reduction direction and a filter coefficient are fixedly defined. As an example, a definition is made where a reduction of ½ in both horizontal and vertical directions is performed in the reduction process and where a 3-tap one-dimensional filter 1 2 1 (/4) as the filter coefficient is performed in a horizontal/vertical order.

The reduced locally-decoded block output by the reduced image generation unit is stored in the reduced decoding image memory 114 and used as a reduced decoding image for displacement vector detection in the reduced-image displacement vector detection unit 104.

Figure 3:
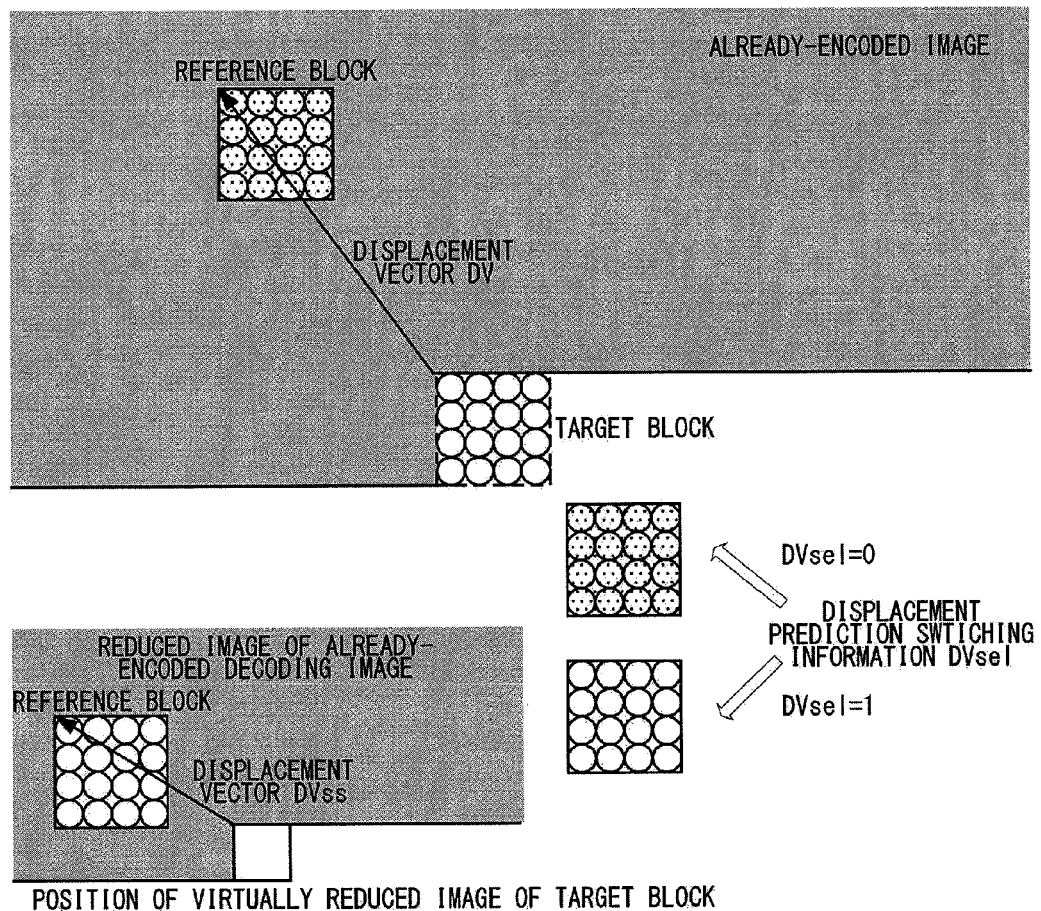
FIG. 3 is a conceptual diagram explaining intra-screen displacement prediction according to the present invention.

As shown in FIG. 3, as for a relationship between the reduced locally-decoded block and the encoding target block, the amount of displacement between the position of the encoding target block in the screen when the encoding target block is virtually reduced and the position of the reference block, serving as a candidate for the prediction image, in the screen is defined as the displacement vector.

The reduced-image displacement vector detection unit 104 inputs a two-dimensional block having the same block size as that of the encoding target block by the reduced decoding image memory 114 using the position in the screen indicated by the displacement vector as a reference. The reduced-image displacement vector detection unit 104 then calculates a correlation value with the encoding target block by the evaluation formula defined by the sum of absolute value errors, the sum of square errors, or the like and detects a displacement vector with the smallest value, which is indicated by the evaluation formula, as a displacement vector value that is used for reduction displacement prediction.

The reduced-image displacement vector detection unit 104 outputs the reduced decoding image, which corresponds to the detected displacement vector value, to the displacement prediction mode determination/signal generation unit 105 as a reduction displacement prediction image along with the detected displacement vector value.

The displacement prediction mode determination/signal generation unit 105 selects the most appropriate prediction mode based on the displacement vector value and displacement prediction image input by the displacement vector detection unit 103 and on the displacement vector value and reduction displacement prediction image input by the reduced-image displacement vector detection unit 104 and outputs information indicating the selected prediction mode and the displacement vector to the entropy encoding unit 115 while outputting the selected prediction image to the subtractor 106 and the adder 111. A description will be made hereinafter regarding the detailed operation of the displacement prediction mode determination/signal generation unit 105.

Based on the DCT coefficient, on which the quantization process has been performed, provided by the quantization unit 108 and on the information indicating the selected prediction mode and the displacement vector provided by the displacement prediction mode determination/signal generation unit 105, the entropy encoding unit 115 performs variable-length encoding on the displacement vector information, the prediction mode information, and the quantized DCT coefficient. The information on which the variable-length encoding has been performed is output to the stream buffer 116.

An encoded stream stored in the stream buffer 116 is output to a recording medium or a transmission line via the output terminal 117. Regarding control of an encoding amount of the encoded stream, the encoding amount of a bit stream stored in the stream buffer 116 is provided to the encoding amount control unit 118 and compared with a target encoding amount, and the fineness of quantization (quantization scale) of the quantization unit 108 is controlled to bring the encoding amount to be close to the target encoding amount.

Figure 2:
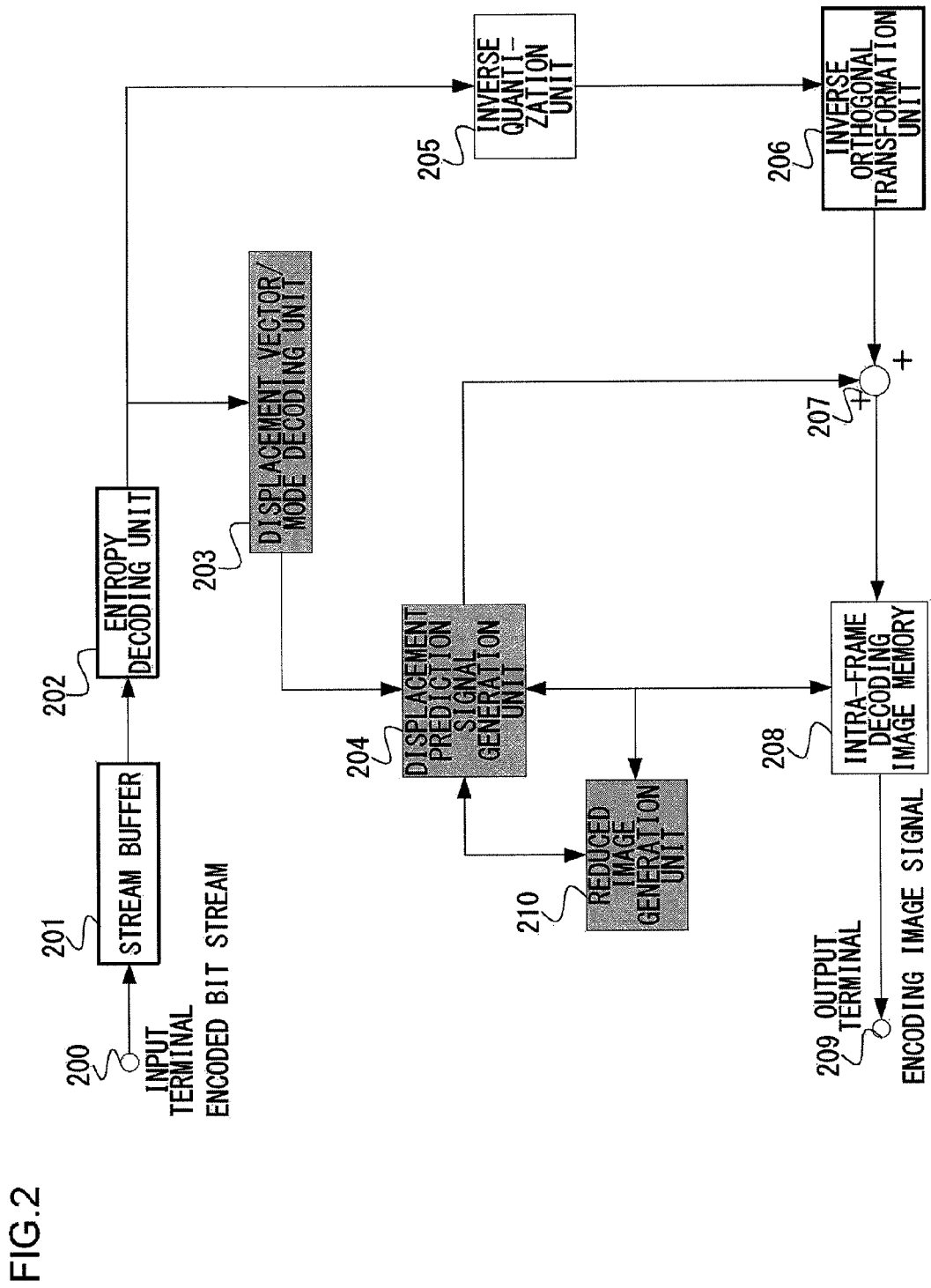
FIG. 2 is a diagram illustrating the configuration of an image decoding device according to the first embodiment of the present invention.

Then, a description is given of the conformation of an image decoding device for decoding an encoded bit stream generated by the image encoding device according to the first embodiment of the present invention FIG. 2 is a configuration diagram illustrating the conformation of the image decoding device according to the first embodiment of the present invention. As shown in FIG. 2, the image decoding device according to the present embodiment comprises an input terminal 200, a stream buffer 201, an entropy decoding unit 202, a displacement vector/mode decoding unit 203, a displacement prediction signal generation unit 204, an inverse quantization unit 205, an inverse orthogonal transformation unit 206, an adder 207, an intra-frame decoding image memory 208, an output terminal 209, and a reduced image generation unit 210.

The displacement vector/mode decoding unit 203, the displacement prediction signal generation unit 204, and the reduced image generation unit 210 that are provided and operations in these processing blocks are features of the first embodiment. Other processing blocks serve as processing blocks that configure an intra-frame encoding process in an image encoding device such as MPEG4-AVC, etc.

An encoded bit stream input by the input terminal 200 is stored in the stream buffer 201. The stored encoded bit stream is provided to the entropy decoding unit 202 by the stream buffer 201, and the entropy decoding unit 202 performs variable-length decoding for encoded displacement vector information, prediction mode information, and a quantized DCT coefficient based on the input bit stream and then outputs the displacement vector information and the prediction mode information to the displacement vector/mode decoding unit 203. For the inverse quantization unit 205, the inverse orthogonal transformation unit 206, the adder 207, and the intra-frame decoding image memory 208, a process similar to a locally-decoding process of a moving-image encoding device according to the first embodiment is performed. A decoding image stored in the intra-frame decoding image memory 208 is displayed on a display device as a decoding image signal via the output terminal 209.

The displacement vector/mode decoding unit 203 has a function of calculating, based on the displacement vector information and prediction mode information input by the entropy decoding unit 202, a selection signal indicating whether a displacement vector value and a displacement prediction signal indicate a prediction signal on which a normal displacement prediction process has been performed or whether the displacement vector value and the displacement prediction signal indicate a prediction signal on which a displacement prediction process with use of a reduced image has been performed and the outputting the selected signal to the displacement prediction signal generation unit 204.

The displacement prediction signal generation unit 204 generates a prediction image based on the displacement vector value and selection signal output by the displacement vector/mode decoding unit 203. When the selection signal indicates the normal displacement prediction, the displacement prediction signal generation unit 204 inputs from the intra-frame decoding image memory 208 a signal of a decoding image at a position obtained by moving a decoding target block by the displacement vector value so as to generate a prediction signal. On the other hand, when the selection signal indicates the displacement prediction with use of a reduced image, the displacement prediction signal generation unit 204 outputs the displacement vector value to the reduced image generation unit 210 and receives a generated reduced image.

In order to generate respective reference blocks corresponding to the position of the encoding target block in the screen when the encoding target block is virtually reduced and corresponding to the position of a reference block that serves as a candidate for the prediction image in the screen, the reduced image generation unit 210 inputs from the intra-frame decoding image memory 208 a decoding image at a position indicated by a vector value of a displacement vector corrected for a pre-reduction displacement and outputs a result of performing a reduction filter process to the displacement prediction signal generation unit 204, as shown in FIG. 3, when the displacement vector value is input by the displacement prediction signal generation unit 204.

The displacement prediction signal generation unit 204 outputs a generated or input prediction image to the adder 207.

In the image decoding device according to the first embodiment of the present invention, a reference block indicated by a displacement vector is generated by a reduction filter only when a reduction displacement prediction is performed in the reduced image generation unit 210. However, it is also possible to employ a configuration where a reduction process is always performed on a decoded two-dimensional block and where the decoded two-dimensional block is then stored in a reduced image memory, as performed in the locally-decoding process in the image encoding device according to the first embodiment.

Figure 4:
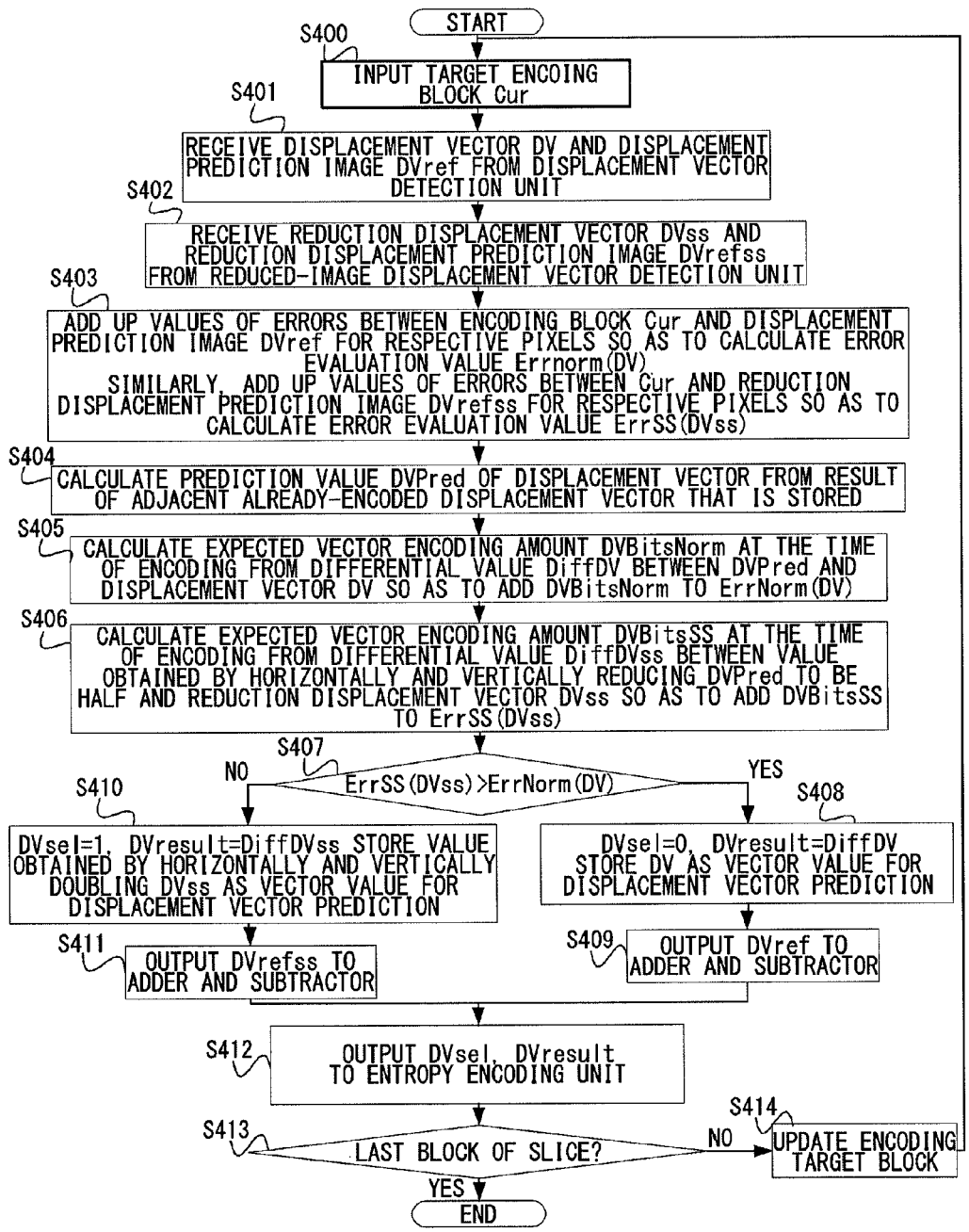
FIG. 4 is a flowchart explaining a displacement-prediction mode determination signal generation process according to the first embodiment of the present invention.

A description is now given of the detailed operation of the displacement prediction mode determination/signal generation unit 105 in the image encoding device according to the first embodiment of the present invention using the flowchart shown in FIG. 4.

The flowchart shown in FIG. 4 indicates the operation of a displacement prediction mode determination process in a unit of a slice defined in a plurality of encoding blocks.

First, an encoding block Cur, which is a target, is input (S400), and a displacement vector DV and a displacement prediction image DVref that correspond to an encoding target block are received from the displacement vector detection unit 103 (S401). Then, a reduction displacement vector DVss and a reduction displacement prediction image DVrefss that correspond to the encoding target block are received from the reduced-image displacement vector detection unit 104 (S402). Then, in order to calculate an evaluation value of an error between the encoding target block and a prediction image according to each prediction mode, the values of errors between the encoding block Cur and the displacement prediction image DVref for respective pixels are added up so as to calculate an error evaluation value ErrNorm(DV), and the values of errors between the encoding block Cur and the reduction displacement prediction image DVrefss for respective pixels are added up so as to calculate an error evaluation value ErrSS(DVss) (S403).

Figure 13:
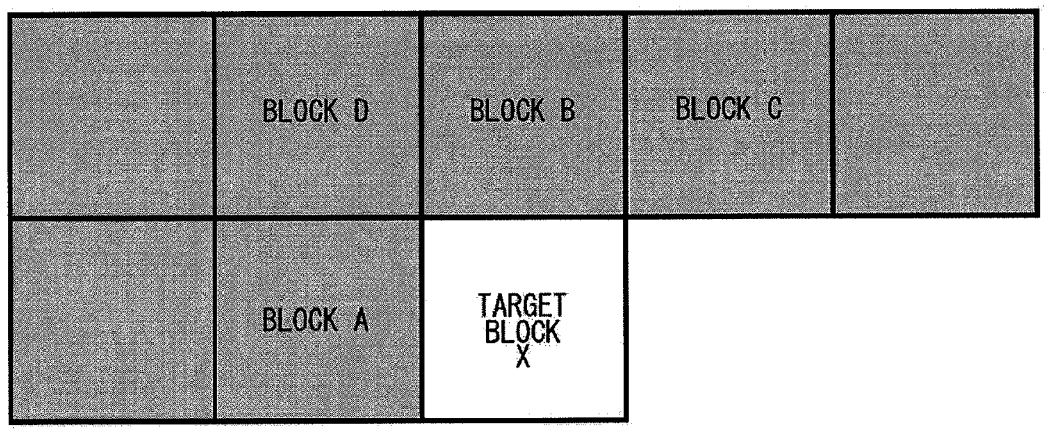
FIG. 13 is a diagram illustrating a relationship between a target block in MPEG4-AVC and an adjacent block used for calculating a prediction motion vector.

Then, an encoding amount that is necessary when encoding a displacement vector value as information is calculated. More specifically, a mode is employed where a displacement vector is predicted based on a prediction value DVpred so as to encode a differential value thereof. For the calculation of the prediction value DVpred, a configuration used for the prediction of a motion vector in MPEG4-AVC, such as the one shown in FIG. 13, is used. As adjacent blocks, three blocks are selected, the three blocks being a block A located to the left of a target block, a block B located on top of the target block, and a block C located to the upper right of the target block. However, when the block C, which is an image edge, is invalid, a block D located to the upper left is used instead of the block C. If the respective components of the displacement vectors of the selected three block are set to be DVAx, DVBx, and DVCx in a horizontal direction and to be DVAy, DVBy, and DVCy in a vertical direction, prediction displacement vector values PDVx and PDVy are generated by selecting median values of the respective three values for the components in a horizontal direction and for the components in a vertical direction as shown in Expression 1 below.

$$PDMVx = \text{Median}(DVAx, DVBx, DVCx)$$

$$PDMVy = \text{Median}(DVAy, DVBy, DVCy) \quad \text{(Expression 1)}$$

As described above, the generated PDMVx and PDMVy are calculated as the prediction value DVpred of the displacement vector (S404).

The differential value DiffDV of a difference between the displacement vector prediction value DVpred and the displacement vector DV is obtained, and an expected vector encoding amount at the time of encoding is calculated so as to add the expected vector encoding amount to ErrNorm(DV) (S405). Regarding the expected vector encoding amount, a necessary encoding amount can be calculated on the assumption that, for example, DiffDV is encoded as a Golomb code.

Similarly, the differential value DiffDVss of a difference between the value of a reduced displacement vector prediction value DVpred and the reduction displacement vector DVss is obtained, and an expected vector encoding amount at the time of encoding is calculated so as to add the expected vector encoding amount to ErrSS(DVss) (S406).

Regarding displacement prediction, an image signal having a similar texture component in a target object different from an encoding target block is extracted as a prediction signal. Thus, when there is a self-similarity regarding a reduced decoding image and an image at the same position in a decoding image signal in a non-reduced state, a configuration is employed where a displacement vector corrected in accordance with a reduction rate is stored as a displacement vector value of an adjacent block in FIG. 13 on the assumption that the displacement vector to be selected exhibits similar displacement. In the first embodiment of the present invention, a differential value of a difference between the value of DVpred that is reduced to be half horizontally and vertically and DVss becomes DiffDvss since a reduction displacement vector is detected from a decoding image that is reduced to be half both horizontally and vertically so as to use the reduction displacement vector as a prediction image. An expected vector encoding amount at the time of encoding DiffDVss is calculated as in the case of DiffDV.

In comparison of the error evaluation value ErrNorm(DV) thus calculated with ErrSS(DVss) (S407), when ErrSS(DVss)>ErrNorm(DV) is satisfied (S407: YES), a selection signal DVsel=0 of a prediction mode and displacement vector information DVresult=DiffDV to be encoded are set, and DV is stored as a vector value used for displacement vector prediction of a subsequent encoding target block (S408). Then, DVref is output to the subtractor 106 and the adder 111 as a prediction image (S409).

On the other hand, when ErrSS(DVss)>ErrNorm(DV) is not satisfied (S407: NO), DVsel=1 and DVresult=DiffDVss are set, and a value obtained by doubling DVss horizontally and vertically is stored as the vector value used for displacement vector prediction of the subsequent encoding target block (S410). Then, DVrefss is output to the subtractor 106 and the adder 111 as a prediction image (S411).

Lastly, SVsel and DVresult are output to the entropy encoding unit 115 (S412), and the process in a unit of an encoding target block is then completed. If the encoding target block is not the last block in a slice (S413: NO), the encoding target block is updated (S414), and the step goes back to S400. If the encoding target block is the last block in the slice (S413: YES), the displacement prediction mode determination process in a unit of a slice is completed.

The point of the present invention according to the first embodiment lies in adding a block of a reduced reference image as a prediction target signal and encoding the block along with information indicating whether reduction has been carried out so as to generate a prediction block having high correlation with an encoding block in order to more fully utilize the self-similarity or textural similarity of an image signal compared to a conventional method. As a result, it is possible to improve the accuracy of intra-frame image signal prediction according to a conventional method. Regarding a displacement vector value, displacement vector prediction from an adjacent block can be properly performed by correcting a prediction value of a displacement vector according to a reduction rate in a normal displacement prediction mode and a reduction displacement prediction mode so that the amount of encoding of displacement vector information can be prevented from being increased.

In a locally-decoded image to be used as a reference image, there are an increase in distortion components that do not exist in an input image and a reduction in high-frequency components due to an effect of encoding degradation, thus lowering correlation with an encoding target block. However, in a process of generating a reduced image, the distortion components are cut out as high-frequency components, and there still exist a lot of high-frequency components as frequency components on a reduced-image pixel basis even after encoding. Thus, a decrease in the correlation is prevented, and the locally-decoded image is used for a prediction process as a prediction block having high correlation with an encoding block.

As a result, the efficiency of intra-frame prediction particularly at the time of high compression can be improved, allowing a high encoding efficiency to be achieved.

Second Embodiment

A description is now given of the conformation of an image encoding device and the conformation of an image decoding device according to a second embodiment of the present invention. The first embodiment is directed to an image encoding or decoding device that uses only correlation within a frame. However, the second embodiment is directed to an image encoding or decoding device, in which the time correlation of a moving image can be utilized, that uses correlation within a frame and correlation between frames.

Figure 5:
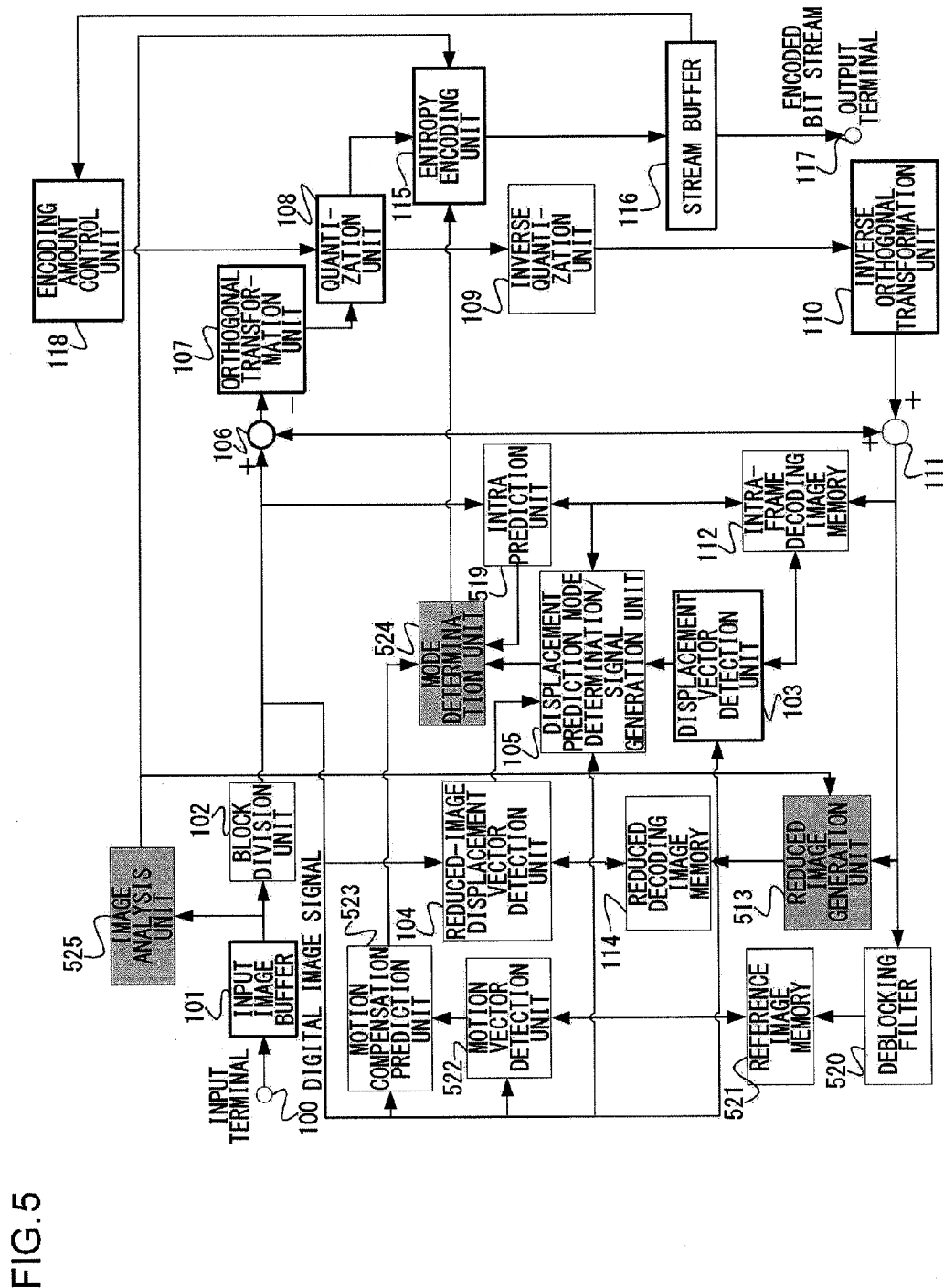
FIG. 5 is a diagram illustrating the configuration of an image encoding device according to a second embodiment of the present invention.

FIG. 5 is a configuration diagram illustrating the conformation of the image encoding device according to the second embodiment of the present invention. As shown in FIG. 5, the image encoding device according to the present embodiment comprises an input terminal 100, an input image buffer 101, a block division unit 102, a displacement vector detection unit 103, a reduced-image displacement vector detection unit 104, a displacement prediction mode determination/signal generation unit 105, a subtractor 106, an orthogonal transformation unit 107, a quantization unit 108, an inverse quantization unit 109, an inverse orthogonal transformation unit 110, an adder 111, an intra-frame decoding image memory 112, a reduced decoding image memory 114, an entropy encoding unit 115, a stream buffer 116, an output terminal 117, and an encoding amount control unit 118, which have similar functions to those according to the first embodiment, and comprises a reduced image generation unit 513, which performs an additional process with respect to the first embodiment, an intra prediction unit 519, a deblocking filter 520, a reference image memory 521, a motion vector detection unit 522, a motion compensation prediction unit 523, a mode determination unit 524, and an image analysis unit 525, which are added processing blocks.

In the added processing blocks, giving a description of the operation of a processing block on which a process defined in MPEG4-Av is performed, an encoding target block is input from the block division unit 102, and the intra prediction unit 519 performs an intra prediction process performed in MPEG4-AVC using a decoding image of an adjacent already-encoded region in the intra-frame decoding image memory 112. The intra prediction unit 519 selects an intra prediction mode with the highest correlation between a prediction image and an encoding target block and outputs an intra prediction image, an intra prediction mode signal, and an error evaluation value to the mode determination unit 524. A filter process for removing distortion at a block border of a unit of a decoding process is performed on a locally-decoded image output by the adder 111 in the deblocking filter 520, and the locally-decoded image is output in the reference image memory 521. The motion vector detection unit 522 performs motion estimation between an encoding target block image obtained from the block division unit 102 and a reference image stored in the reference image memory 521. As a general motion estimation process, a reference image at a position obtained by moving the same position in the screen by a predetermined displacement amount is cut out, and a block matching process for obtaining, as a motion vector value, a displacement amount with the least prediction error when the image is set to be a prediction block, while changing the displacement amount, is used. Taking into account the encoding amount necessary for encoding a difference between the vector prediction value, calculated based on the motion vector value used for an adjacent block such as the one shown in FIG. 13, and the motion vector value, the motion vector detection unit 522 detects the most appropriate motion vector value.

The motion vector value obtained by the motion vector detection unit 522 is provided to the motion compensation prediction unit 523. A prediction signal with the least differential information to be encoded is selected from prediction signals for a plurality of reference images, and the selected motion compensation prediction mode and the prediction signal to the mode determination unit 524. A configuration for applying intra prediction and motion compensation prediction of a conventional method is employed for the above-stated processing blocks.

Figure 6:
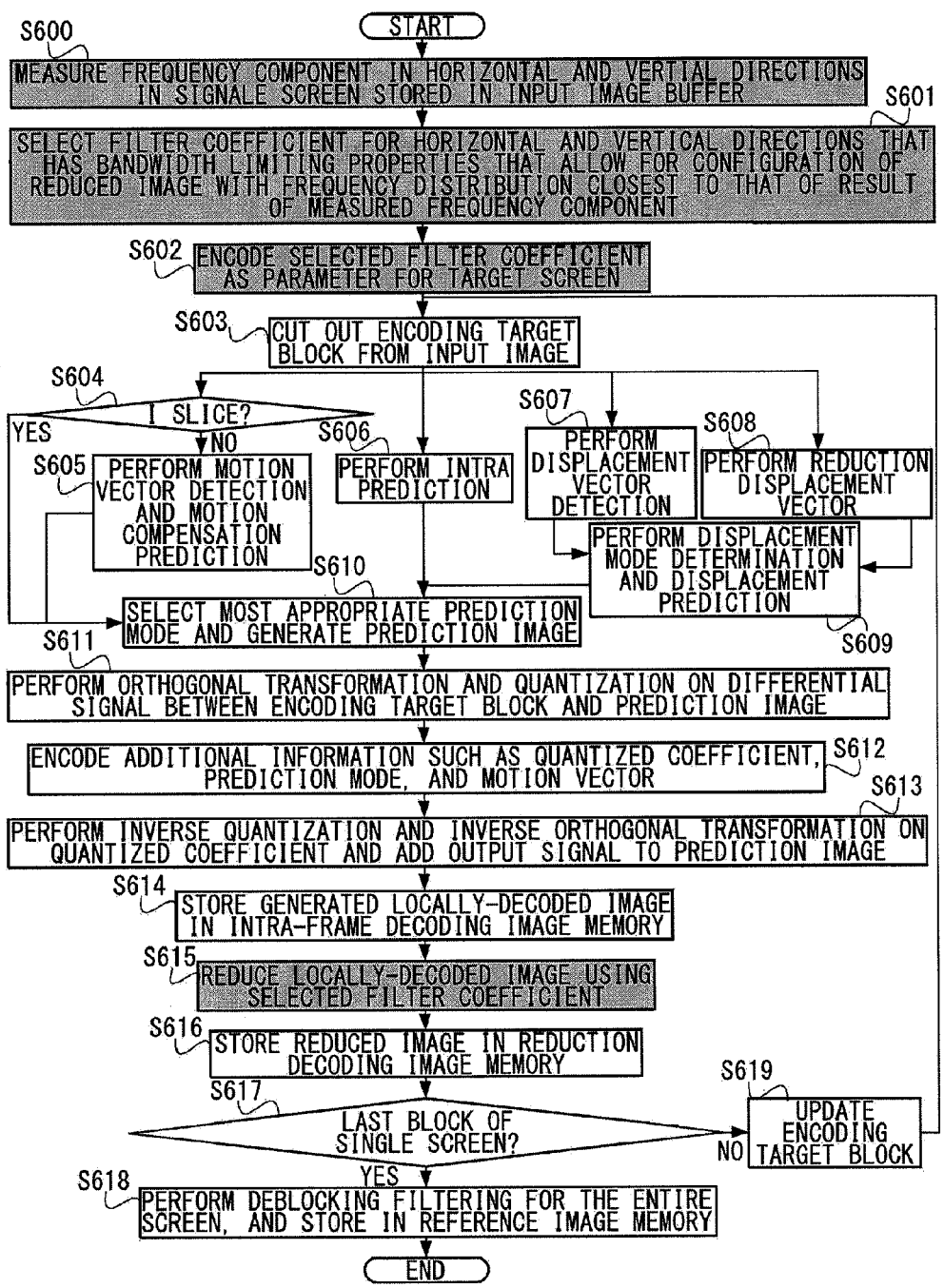
FIG. 6 is a flowchart explaining an encoding process according to the second embodiment of the present invention.

Using the flowchart for the encoding process shown in FIG. 6, a description is now given of the operation of the image analysis unit 525, the reduced image generation unit 513, and the mode determination unit 524, which are processing blocks for performing operation that indicates the features according to the second embodiment of the present invention.

The flowchart shown in FIG. 6 indicates the operation of the encoding process of a single screen that is defined by a plurality of encoding blocks.

First, the image data of a single screen stored in the input image buffer 101 is input to the image analysis unit 525 so as to measure a frequency component in a horizontal and vertical directions in the single screen (S600). Frequency analysis by Fourier transformation, frequency analysis by wavelet transformation, etc., can be used as a measuring method. In the present embodiment, a result obtained by performing Fast Fourier Transfer FFT in one dimension separately in horizontal and vertical directions is stored, and the value obtained by adding the results of the entire screen is set to be a measured value. The unit of FFT is set to be, for example, 32 pixel unit, and an analysis position is moved for every 16 pixels to reduce the effect of a border of an analysis unit.

A coefficient set of a low-pass filter that allows bandwidth limitation to be imposed in a plurality of bandwidths is prepared in advance in the image analysis unit 525. An existing digital filter designing method can be used for a method of designing a filter coefficient.

A filter coefficient for a horizontal and vertical directions is selected that has a bandwidth limiting properties that allow for the configuration of a reduced image with a frequency distribution closest to a resulting frequency distribution of a result of measuring the frequency component (S601). As a selection method, it is possible to use a method for selecting a filter coefficient with the widest pass band in filters that set to be an inhibition zone the frequencies in which a frequency component distribution of a corresponding frequency or more is at most a certain threshold value. It is also possible to actually measure a frequency component in a horizontal and vertical directions in a single screen for a reduced image obtained by reducing an input image by each filter coefficient so as to select a filter coefficient having the closest frequency properties.

Then, the image analysis unit 525 outputs a the selected filter coefficient or a parameter specifying the coefficient to the entropy encoding unit 115 and the reduced image generation unit 513.

As additional information related to the encoding of the entire single screen, the entropy encoding unit 115 encodes the selected filter coefficient or the parameter specifying the coefficient in such a manner that the parameter is added to, for example, PPS (Picture Parameter Set) or the like defined in MPEG4-AVC (ISO/IEC 14496-10 Advanced Video Coding) (S602).

The encoding process of a single screen is started using the filter coefficient thus selected. First, an encoding target block is cut out from an input image (S603). If the encoding target block is not in an I slice (S604: NO), motion vector detection and motion compensation prediction are performed (S605). Intra prediction is performed in parallel (S606) so as to perform displacement vector detection (S607) and then to perform reduction displacement vector detection (S608). Displacement mode determination and displacement prediction are then performed to select displacement prediction to be used from either displacement prediction or reduction displacement prediction (S609). The method explained in the first embodiment is used for a determination method.

Based on the motion vector prediction, the intra prediction, and the displacement prediction calculated as a result, mode determination unit 524 selects the most appropriate prediction mode, generates a prediction image, and outputs the prediction image to the subtractor 106 and the adder 111 (S610) while also outputting, to the entropy encoding unit 115, information indicating whether or not the prediction mode, the motion vector, and the displacement vector or the reduced image in the displacement prediction has been used. A differential signal between the encoding target block and the prediction image is then calculated, and orthogonal transformation and quantization are performed (S611). The information is encoded that indicates whether or not a quantized orthogonal transformation coefficient and the prediction mode, the motion vector, the displacement vector, or the reduced image in the displacement prediction has been used (S612).

Inverse quantization and inverse orthogonal transformation are then performed on the quantized coefficient, and an output signal is added to the prediction image (S613). A locally-decoded image that is generated is stored in the intra-frame decoding image memory 112 (S614).

The reduced image generation unit 513 sets a filter coefficient for when the reduction process is performed horizontally and vertically based on the locally-decoded image input by the adder 111 and on the selected coefficient input by the image analysis unit 525 or the parameter specifying the coefficient and then reduces the locally-decoded image using the filter coefficient (S615). The reduced image generation unit 513 stores the reduced locally-decoded image in the reduced decoding image memory 114 (S616) and ends the encoding process on a target encoding block.

If the target encoding block is the last block of the single screen (S617: YES), the deblocking filter 520 performs deblocking filtering for the entire screen, stores the target encoding block in the reference image memory 521 (S618), and then ends the encoding process of the single screen. If the encoding target block is not the last block of the single screen (S617: NO), the encoding target block is updated (S619), and the step goes back to S603.

Then, a description is given of the conformation of an image decoding device for decoding an encoded bit stream generated by the image encoding device according to the second embodiment of the present invention.

Figure 7:
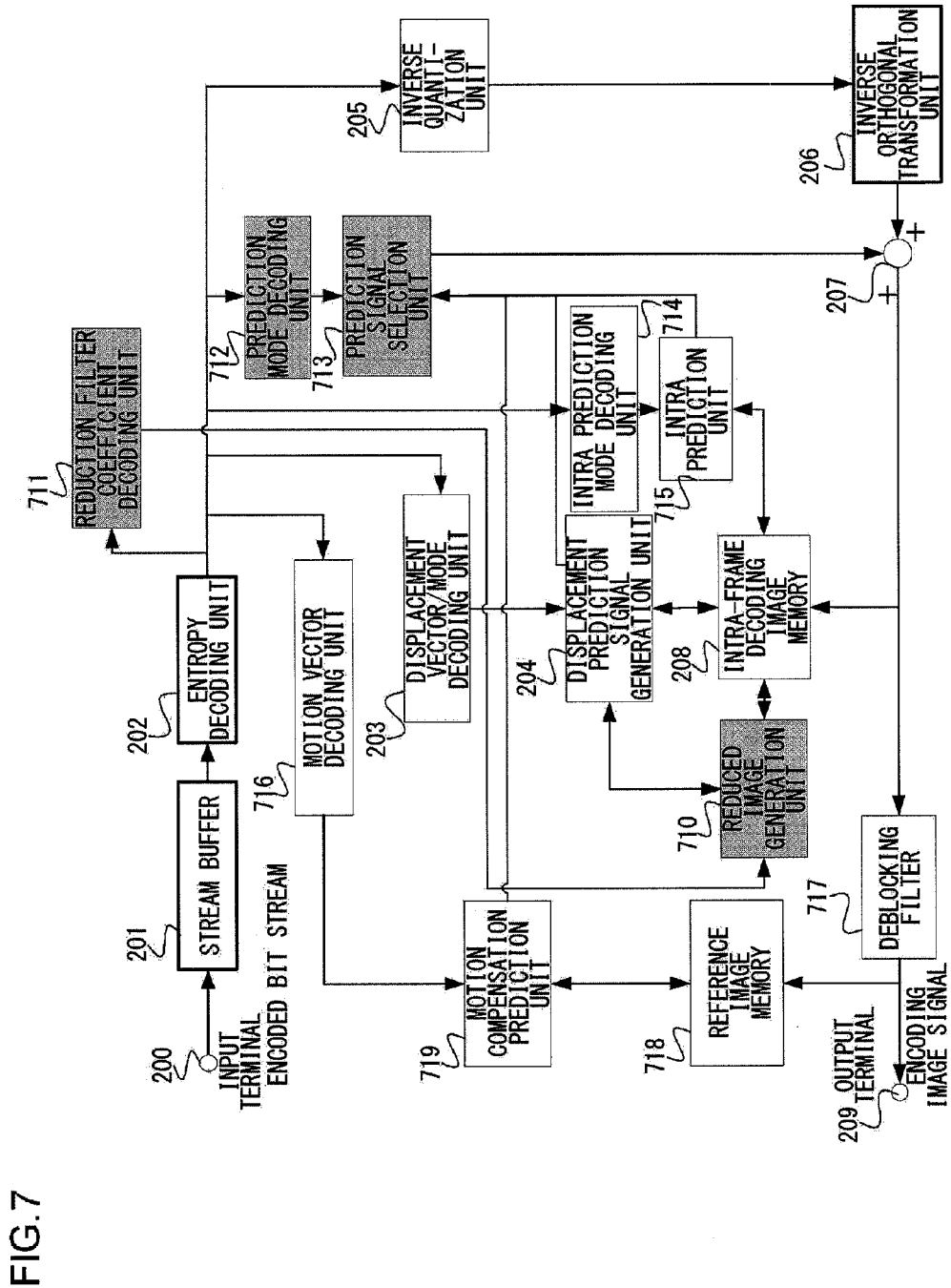
FIG. 7 is a diagram illustrating the configuration of an image decoding device according to the second embodiment of the present invention.

FIG. 7 is a configuration diagram illustrating the conformation of the image decoding device according to the second embodiment of the present invention. As shown in FIG. 7, the image decoding device according to the present embodiment comprises an input terminal 200, a stream buffer 201, an entropy decoding unit 202, a displacement vector/mode decoding unit 203, an inverse quantization unit 205, an inverse orthogonal transformation unit 206, an adder 207, an intra-frame decoding image memory 208, and an output terminal 209, which have similar functions as those according to the first embodiment, and comprises a reduced image generation unit 710, which performs an additional process with respect to the first embodiment, a reduction filter coefficient decoding unit 711, a prediction mode decoding unit 712, a prediction signal selection unit 713, an intra prediction mode decoding unit 714, an intra prediction unit 715, a motion vector decoding unit 716, a deblocking filter 717, a reference image memory 718, and a motion compensation prediction unit 719, which are added processing blocks.

As in the explanation of the image encoding device according to the second embodiment in FIG. 5, a configuration for decoding intra prediction and motion compensation prediction in the MPEG4-AVC standard is employed for the intra prediction mode decoding unit 714, the intra prediction unit 715, the motion vector decoding unit 716, the deblocking filter 717, the reference image memory 718, and the motion compensation prediction unit 719 among the added processing blocks. Since processing blocks that have the features of the present invention are not employed, an explanation thereof is omitted.

Figure 8:
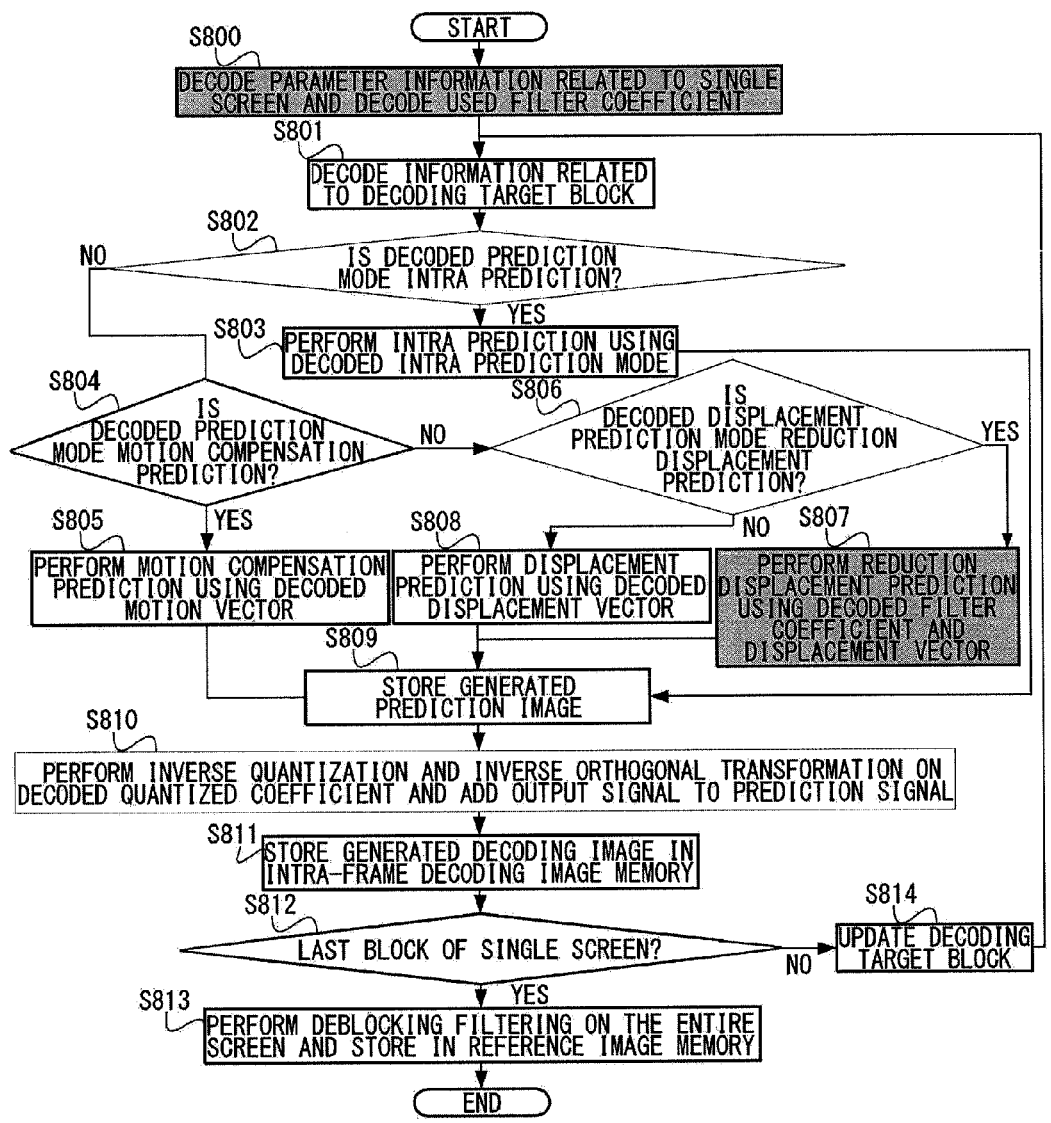
FIG. 8 is a flowchart explaining a decoding process according to the second embodiment of the present invention.

Using the flowchart for the encoding process shown in FIG. 8, a description is now given of the operation of the reduction filter coefficient decoding unit 711, the prediction mode decoding unit 712, the prediction signal selection unit 713, and the reduced image generation unit 710, which are processing blocks for performing operation that indicates the features according to the second embodiment of the present invention.

The flowchart shown in FIG. 8 indicates the operation of the encoding process of a single screen that is defined by a plurality of encoding blocks.

The entropy decoding unit 202 detects additional information related to the encoding of a entire single screen from an encoded bit stream stored in the stream buffer 201 by the input terminal 200 and then inputs the additional information to the reduction filter coefficient decoding unit 711. The reduction filter coefficient decoding unit 711 decodes parameter information related to the single screen and then decodes a used filter coefficient from the parameter information or decodes information specifying a filter coefficient (S800).

The encoding process of the single screen is then started. First, a quantized coefficient for a decoding target block is output from the entropy decoding unit 202 to the inverse quantization unit 205, and additional information related to the decoding target block is output to the prediction mode decoding unit 712. The prediction mode decoding unit 712 decodes the information related to the decoding target block (S801) and outputs a decoded prediction mode to the prediction signal selection unit 713. If the decoded prediction mode is intra prediction (S802: YES), the prediction mode decoding unit 712 allows the intra prediction mode decoding unit 714 to decode the intra prediction mode, and the intra prediction unit 715 performs intra prediction by an already-decoded adjacent pixel stored in the intra-frame decoding image memory 208 (S803) using the decoded intra prediction mode so as to output an intra prediction result to the prediction signal selection unit 713.

If the decoded prediction mode is not intra prediction (S802: NO), the prediction mode decoding unit 712 checks whether the decoded prediction mode is motion compensation prediction (S804). If the decoded prediction mode is the motion compensation prediction (S804: YES), the prediction mode decoding unit 712 allows the motion compensation prediction unit 719 to perform motion compensation by a reference image stored in the reference image memory 718 using a motion vector decoded in the motion vector decoding unit 716 (S805) and outputs a motion compensation prediction result to the prediction signal selection unit 713.

If the decoded prediction mode is not the motion compensation prediction (S804: NO), the information indicating the displacement prediction mode and the displacement vector is decoded by the displacement vector/mode decoding unit 203, and the decoded information is output to the displacement prediction signal generation unit 204. If the decoded prediction mode is reduction displacement prediction (S806: YES), the reduced image generation unit 710 inputs from the intra-frame decoding image memory 208 a decoded image at a position indicated by the vector value of a displacement vector corrected in accordance with displacement before the reduction using reduction filter coefficient information input by the reduction filter coefficient decoding unit 711 and using information indicating the displacement vector input by the displacement prediction signal generation unit 204, performs reduction displacement prediction by performing a reduction filter process using a filter coefficient specified by the reduction filter coefficient information (S807), and outputs a reduction displacement prediction result to the displacement prediction signal generation unit 204.

If the decoded prediction mode is not the reduction displacement prediction (S806: NO), the displacement prediction signal generation unit 204 inputs from the intra-frame decoding image memory 208 a signal of a decoding image at a position obtained by moving the decoding target block by the displacement vector value so as to generate a prediction signal using the information indicating the displacement vector input by the displacement vector/mode decoding unit 203 (S808). The displacement prediction signal generation unit 204 outputs a signal generated in the decoding target block to the prediction signal selection unit 713 among the displacement prediction signal and the reduction displacement prediction signal input from the reduced image generation unit 710.

The prediction signal selection unit 713 stores a prediction signal input from any one of the intra prediction unit 715, the motion compensation prediction unit 719, and the displacement prediction signal generation unit 204 (S809) and output the prediction signal to the adder 207.

Inverse quantization and inverse orthogonal transformation are performed on a quantized coefficient output from the entropy decoding unit 202, and an output signal and the prediction signal are added by the adder 207 (S810) so that a decoding image is generated. The generated decoding image is stored in the intra-frame decoding image memory 208 (S811), and the decoding process for the decoding target block is ended.

If the decoding target block is the last block of the single screen (S812: YES), deblocking filtering is performed by the deblocking filter 717 for the entire screen. The decoding target block is then stored in the reference image memory 718 (S813), and the decoding process of the single screen is then ended.

On the other hand, if the decoding target block is not the last block in a slice (S812: NO), the position of the decoding target block is updated (S814), and the step goes back to S801.

In the second embodiment, a template with signal properties similar to those of an input image can be generated as a reduced image by setting the properties of a bandwidth limiting filter for reducing an already-encoded decoding image used as the template based on a result of measuring the band properties of the input image and then by selecting from a plurality of filter parameters that can be defined. Even when the deterioration of a decoding image is severe, a component stored when generating the reduced image is an intermediate or low frequency component before the reduction and thus has little effect from encoding deterioration. Thus, the quality of a signal used as a template is maintained, and a prediction signal with little effect of a decrease in a prediction efficiency due to the encoding deterioration can be generated. Therefore, a prediction efficiency is more improved compared to a conventional method, providing an effect of increasing the encoding efficiency.

Control with a little information can be possible by selecting information for generating a reduction filter in a unit of a screen from a filter set that has been set in advance according to the bandwidth limiting properties, thus preventing an increase in additional information.

When using the encoding device according to the second embodiment of the present invention in a device in which optical properties can be identified such as a digital camera and a camcorder, it is also possible to input the property information of an input device (camera) in the image analysis unit 525 and to set a reduction filter coefficient for generating a reduced image. Thus, similar effects can be realized.

Third Embodiment

A description is now given of the conformation of an image encoding device according to the third embodiment of the present invention. In the third embodiment, identification of a reduced filter coefficient by frequency analysis is not performed for the configuration according to the second embodiment. However, a configuration is employed where the most appropriate reduction filter coefficient is set and used for encoding and decoding processes by measuring a prediction efficiency that involves displacement of a reduced image and an input image. Therefore, an image decoding device according to the third embodiment can be realized by a configuration that is same as the image decoding device according to the second embodiment. Thus, a description is given regarding only an encoding device.

Figure 9:
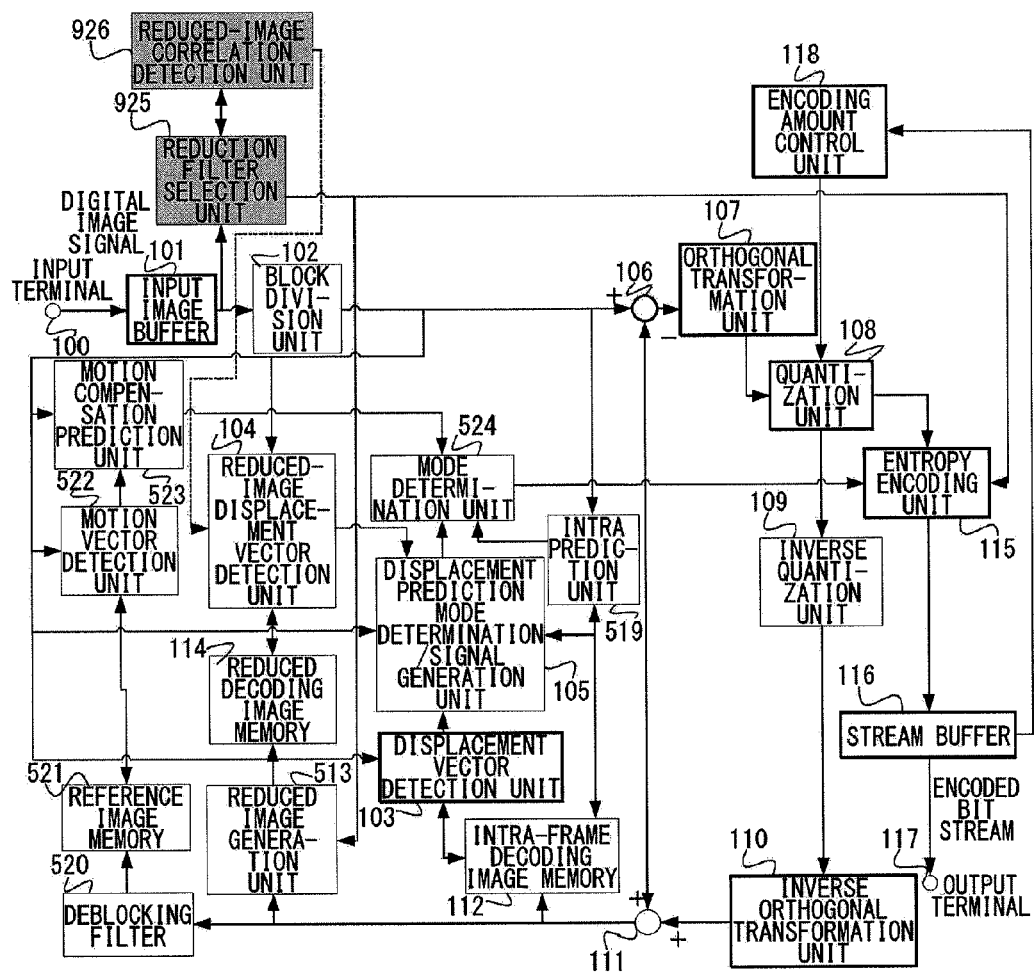
FIG. 9 is a diagram illustrating the configuration of an image encoding device according to a third embodiment of the present invention.

FIG. 9 is a configuration diagram illustrating the conformation of the image encoding device according to the third embodiment of the present invention. The configuration of the image encoding device according to the third embodiment is different from the configuration of the image encoding device according to the second embodiment shown in FIG. 5 in that a reduction filter selection unit 925 and a reduced-image correlation detection unit 926 are used instead of the image analysis unit 525.

Figure 10:
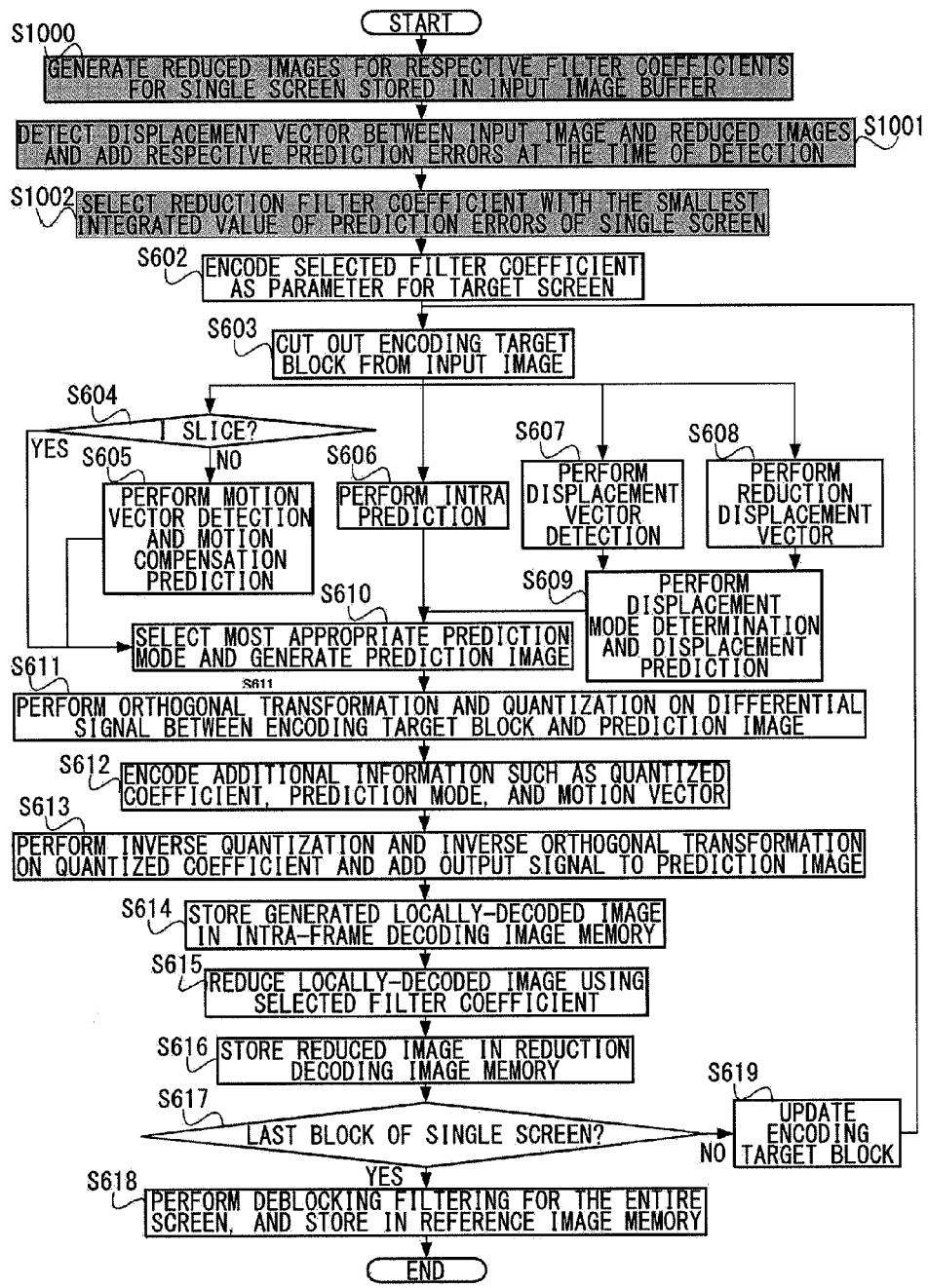
FIG. 10 is a flowchart explaining an encoding process according to the third embodiment of the present invention.
Figure 11:
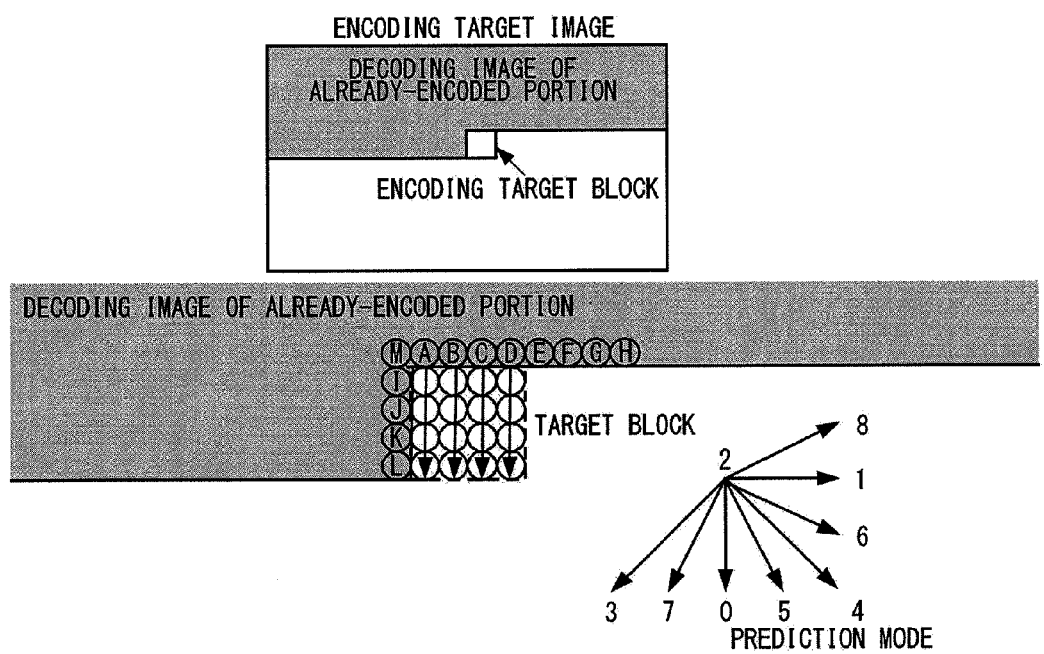
FIG. 11 is a conceptual diagram for intra prediction according to a conventional method.

Using the flowchart for an encoding process according to the third embodiment shown in FIG. 10, a description is given of the operation of the reduction filter selection unit 925 and the reduced-image correlation detection unit 926.

Different from the encoding process flowchart according to the second embodiment shown in FIG. 6, the encoding process flowchart according to the third embodiment shown in FIG. 10 comes with processes in S1000, S1001, and S1002 instead of the processes in S600 and S601.

First, the image data of a single screen stored in the input image buffer 101 is input to the reduction filter selection unit 925, and a plurality of reduced images are generated using a plurality of filters prepared in advance that have different band properties (S1000).

The input image and the reduced images of the input image generated by the respective reduction filters are then output to the reduced-image correlation detection unit 926 from the reduction filter selection unit 925. Correlation is measured by detecting the respective reduced images and a displacement vector of the input image by the reduced-image correlation detection unit 926 and then by adding respective prediction error values at the time of detection (S1001). A processing unit at the time of detecting a displacement vector can possibly be the same as or different from a block unit for displacement prediction that is used at the time of encoding. It is also possible to detect a displacement vector for the entire region of a single screen and to extract a block with little neighbor correlation with a target block in the input image so as to detect a displacement vector for the extracted block.

The integrated value of prediction errors when respective reduction filter coefficients are used is output to the reduction filter selection unit 925 from the reduced-image correlation detection unit 926. The reduction filter selection unit 925 compares the integrated value, selects a reduction filter coefficient with the smallest integrated value, and sets the reduction filter coefficient as a filter coefficient (S1002).

The reduction filter selection unit 925 outputs the selected filter coefficient or a parameter specifying the coefficient to the entropy encoding unit 115 and the reduced image generation unit 513.

As in the case of the second embodiment, as additional information related to the encoding of the entire single screen, the entropy encoding unit 115 encodes the selected filter coefficient or a parameter specifying the coefficient in such a manner that the parameter is added to, for example, PPS (Picture Parameter Set) or the like defined in MPEG4-AVC (ISO/IEC 14496-10 Advanced Video Coding) (S602).

Regarding an encoding process of a single screen described hereinafter, a process similar to that of the second embodiment is performed. Thus, the explanation thereof is omitted.

In the third embodiment, a reduced image with high correlation properties when performing displacement prediction on an input image can be generated by measuring the properties of a bandwidth limiting filter for reducing an already-encoded decoding image used as a template, by measuring the degree of correlation between an input image and a reduced image obtained by imposing bandwidth limitation on the input image by a plurality of filter parameters that can be defined, in such a manner that a displacement vector is detected, and by selecting a filter parameter based on a measurement result.

Therefore, a template that is more suitable as a prediction signal in the encoding process can be generated by the reduced image, thus allowing prediction accuracy to be improved.

In the third embodiment, a displacement vector value obtained in the reduced-image correlation detection unit 926 can possibly used directly as a displacement vector value for which a reduced encoding image is used by being output to the reduced-image displacement vector detection unit 104 when a unit of a two-dimensional block for which a displacement vector is detected is the same as that of an encoding target block. It is also possible to use the displacement vector value as a reference value at the time of detecting a displacement vector (to measure a prediction error value for a surrounding N pixel of the vector value so as to detect a displacement vector).

The image encoding devices and the image decoding devices presented as the first, second, and third embodiments can be implemented physically by a CPU (Central Processing Unit), a recording device such as a memory, a display device such as a display, and a computer provided with a means for communicating to a transmission path. A means provided with the presented functions can be realized as a computer program and can be implemented.

DESCRIPTION OF THE REFERENCE NUMERALS 100 input terminal
101 input image buffer
102 block division unit
103 displacement vector detection unit
104 reduced-image displacement vector detection unit
105 displacement prediction mode determination/signal generation unit
106 subtractor
107 orthogonal transformation unit
108 quantization unit
109 inverse quantization unit
110 inverse orthogonal transformation unit
111 adder
112 intra-frame decoding image memory
113 reduced image generation unit
114 reduced decoding image memory
115 entropy encoding unit
116 stream buffer
117 output terminal
118 encoding amount control unit
200 input terminal
201 stream buffer
202 entropy decoding unit
203 displacement vector/mode decoding unit
204 displacement prediction signal generation unit
205 inverse quantization unit
206 inverse orthogonal transformation unit
207 adder
208 intra-frame decoding image memory
209 output terminal 210 reduced image generation unit
513 reduced image generation unit
519 intra prediction unit
520 deblocking filter
521 reference image memory
522 motion vector detection unit
523 motion compensation prediction unit
524 mode determination unit
525 image analysis unit
710 reduced image generation unit
711 reduction filter coefficient decoding unit
712 prediction mode decoding unit
713 prediction signal selection unit
714 intra prediction mode decoding unit
715 intra prediction unit
716 motion vector decoding unit
717 deblocking filter
718 reference image memory
719 motion compensation prediction unit
925 reduction filter selection unit
926 reduced-image correlation detection unit

INDUSTRIAL APPLICABILITY

The present invention can be used in techniques of encoding and decoding an image signal.

The invention claimed is:

1. An image encoding device having:
a displacement vector detection unit configured to search, given an encoding target block, for a signal with high correlation with an encoding target block using a locally-decoded image in a block in a same already encoded image signal so as to calculate, using a signal with the highest correlation as a displacement prediction signal, a displacement vector, which is a displacement in a screen between the encoding target block and the displacement prediction signal;
an image analysis unit configured to measure or receive a frequency property of an input image in a unit of a screen as input information and to select, as a reduction filter coefficient used when generating a reduced image, a filter coefficient that allows a frequency property of the reduced image to be close to the frequency property of the input image;
a reduced-image generation unit configured to generate a signal resulting from performing reduction at least either horizontally or vertically for the locally-decoded image in the block in the same already encoded image signal; and
a reduced-image displacement vector detection unit configured to search, given the encoding target block, for a signal with high correlation with the encoding target block using the signal resulting from performing reduction thus generated by the reduced-image generation unit so as to obtain, using the signal with the highest correlation as the displacement prediction signal, the displacement vector, which is a displacement in the screen between a reduced encoding target block and the reduction displacement prediction signal; and
a displacement prediction mode determination/signal generation unit configured to select a signal with high correlation with the encoding target block from the displacement prediction signal and the reduction displacement prediction signal and to output a displacement vector used for a signal selected as a prediction signal and information indicating a selection result, and wherein:
the reduced image generation unit generates a reduced signal using the reduction filter coefficient selected by the image analysis unit; and
a differential signal between the prediction signal and the encoding target block, the displacement vector, and the information indicating the selection result are encoded.

2. An image encoding device having:
a displacement vector detection unit configured to search, given an encoding target block, for a signal with high correlation with an encoding target block using a locally-decoded image in a block in a same already encoded image signal so as to calculate, using a signal with the highest correlation as a displacement prediction signal, a displacement vector, which is a displacement in a screen between the encoding target block and the displacement prediction signal;
a reduced-image correlation detection unit configured to calculate a value indicating correlation between an input image and a reduced image obtained by reducing the input image by a plurality of filters having bandwidth limiting properties;
a reduction filter selection unit configured to select, as a reduction filter coefficient, the coefficient of a filter that generates a reduced image with the highest correlation based on the calculated value indicating the correlation; and
a reduced-image generation unit configured to generate a signal resulting from performing reduction at least either horizontally or vertically for the locally-decoded image in the block in the same already encoded image signal;
a reduced-image displacement vector detection unit configured to search, given the encoding target block, for a signal with high correlation with the encoding target block using the signal resulting from performing reduction thus generated by the reduced-image generation unit so as to obtain, using the signal with the highest correlation as the displacement prediction signal, the displacement vector, which is a displacement in the screen between a reduced encoding target block and the reduction displacement prediction signal;
a displacement prediction mode determination/signal generation unit configured to select a signal with high correlation with the encoding target block from the displacement prediction signal and the reduction displacement prediction signal and to output a displacement vector used for a signal selected as a prediction signal and information indicating a selection result, and wherein:
the reduced-image generation unit generates a reduced signal using the reduction filter coefficient selected by the reduction filter selection unit; and
a differential signal between the prediction signal and the encoding target block, the displacement vector, and the information indicating the selection result are encoded.

3. An image decoding device having:
a displacement vector/mode decoding unit configured to decode a displacement vector that is a displacement between a prediction signal, generated from a decoding image of a block in a same already decoded image signal for a decoding target block based on an encoding stream encoded in a block unit, and the decoding target block and information indicating whether or not a prediction signal is generated by reducing the decoding image specified by the displacement vector;

a reduction filter coefficient decoding unit configured to decode from the encoding stream information specifying a filter coefficient used when generating a reduced image; and a displacement prediction signal generation unit configured to generate a prediction signal from the decoding image in accordance with the displacement vector, the information indicating whether or not the prediction signal is generated by reducing the decoding image, and the information specifying the filter coefficient used when generating the reduced image, and wherein the decoding image is calculated by adding the prediction signal and a differential signal corresponding to a difference between the prediction signal decoded from the encoding stream and the decoding target block.

4. An image encoding method comprising:

searching, given an encoding target block, for a signal with high correlation with an encoding target block using a locally-decoded image in a block in a same already encoded image signal so as to calculate, using a signal with the highest correlation as a displacement prediction signal, a displacement vector, which is a displacement in a screen between the encoding target block and the displacement prediction signal;

measuring or receiving a frequency property of an input image in a unit of a screen as input information and selecting, as a reduction filter coefficient used when generating a reduced image, a filter coefficient that allows a frequency property of the reduced image to be close to the frequency property input image;

generating a signal resulting from performing reduction at least either horizontally or vertically for the locally-decoded image in the block in the same already encoded image signal;

searching, given the encoding target block, for a signal with high correlation with the encoding target block using the signal resulting from performing reduction thus generated so as to obtain, using the signal with the highest correlation as the displacement prediction signal, the displacement vector, which is a displacement in the screen between a reduced encoding target block and the reduction displacement prediction signal;

selecting a signal with high correlation with the encoding target block from the displacement prediction signal and the reduction displacement prediction signal and outputting a displacement vector used for a signal selected as a prediction signal and information indicating a selection result;

generating a reduced signal using the reduction filter coefficient thus selected; and encoding a differential signal between the prediction signal and the encoding target block, the displacement vector, and the information indicating the selection result.

5. An image decoding method comprising:

decoding a displacement vector that is a displacement between a prediction signal, generated from a decoding image of a block in a same already decoded image signal for a decoding target block based on an encoding stream encoded in a block unit, and the decoding target block and information indicating whether or not a prediction signal is generated by reducing the decoding image specified by the displacement vector;

decoding from the encoding stream information specifying a filter coefficient used when generating a reduced image;

generating a prediction signal from the decoding image in accordance with the displacement vector and the information indicating whether or not the prediction signal is generated by reducing the decoding image, and the information specifying the filter coefficient used when generating the reduced image; and calculating the decoding image by adding the prediction signal and a differential signal corresponding to a difference between the prediction signal decoded from the encoding stream and the decoding target block.

* * * * *